United States Patent [19]

Noggle

[11] Patent Number: 5,336,026
[45] Date of Patent: Aug. 9, 1994

[54] ADJUSTABLE BORING BAR

[75] Inventor: Kenneth G. Noggle, West Bloomfield, Mich.

[73] Assignee: Valenite Inc., Troy, Mich.

[21] Appl. No.: 994,020

[22] Filed: Dec. 21, 1992

[51] Int. Cl.⁵ .................................. B23B 29/02
[52] U.S. Cl. .................... 408/147; 407/39; 407/45; 407/75; 407/81; 408/154; 408/180
[58] Field of Search ............... 407/39, 45, 67, 68, 407/75, 81, 83, 90; 408/153, 154, 173, 180, 181, 184, 187, 147

[56] References Cited

U.S. PATENT DOCUMENTS

| | | |
|---|---|---|
| 3,885,282 | 5/1975 | Pataky . |
| 4,627,771 | 12/1986 | Kieninger ............... 407/39 |
| 4,631,994 | 12/1986 | Jester et al. . |
| 4,692,069 | 9/1987 | Kieninger ............. 408/180 |
| 4,848,977 | 7/1989 | Kieninger ............... 407/39 |
| 4,927,301 | 5/1990 | Reiterman . |
| 5,123,787 | 6/1992 | Hunt ..................... 408/180 |
| 5,154,551 | 10/1992 | Noggle . |

FOREIGN PATENT DOCUMENTS

| | | | |
|---|---|---|---|
| 1296330 | 5/1969 | Fed. Rep. of Germany ........ 407/45 |
| 904900 | 2/1982 | U.S.S.R. ........................... 407/83 |

*Primary Examiner*—Daniel W. Howell
*Attorney, Agent, or Firm*—Bill C. Panagos

[57] ABSTRACT

An adjustable cartridge to be mounted in the end of a boring bar, the cartridge including an anvil rotatably affixed to said boring bar, said anvil including a pocket into which a indexable insert is affixed. The anvil is secured in an axially oriented slot which includes an arcuate seating face which includes a key and key way slot. Rotation of the anvil within the slot effects radial adjustment of the insert a key pin serves to pivotally secure the cartridge within the pocket. In addition, the level or back taper of the insert can be adjusted.

9 Claims, 2 Drawing Sheets

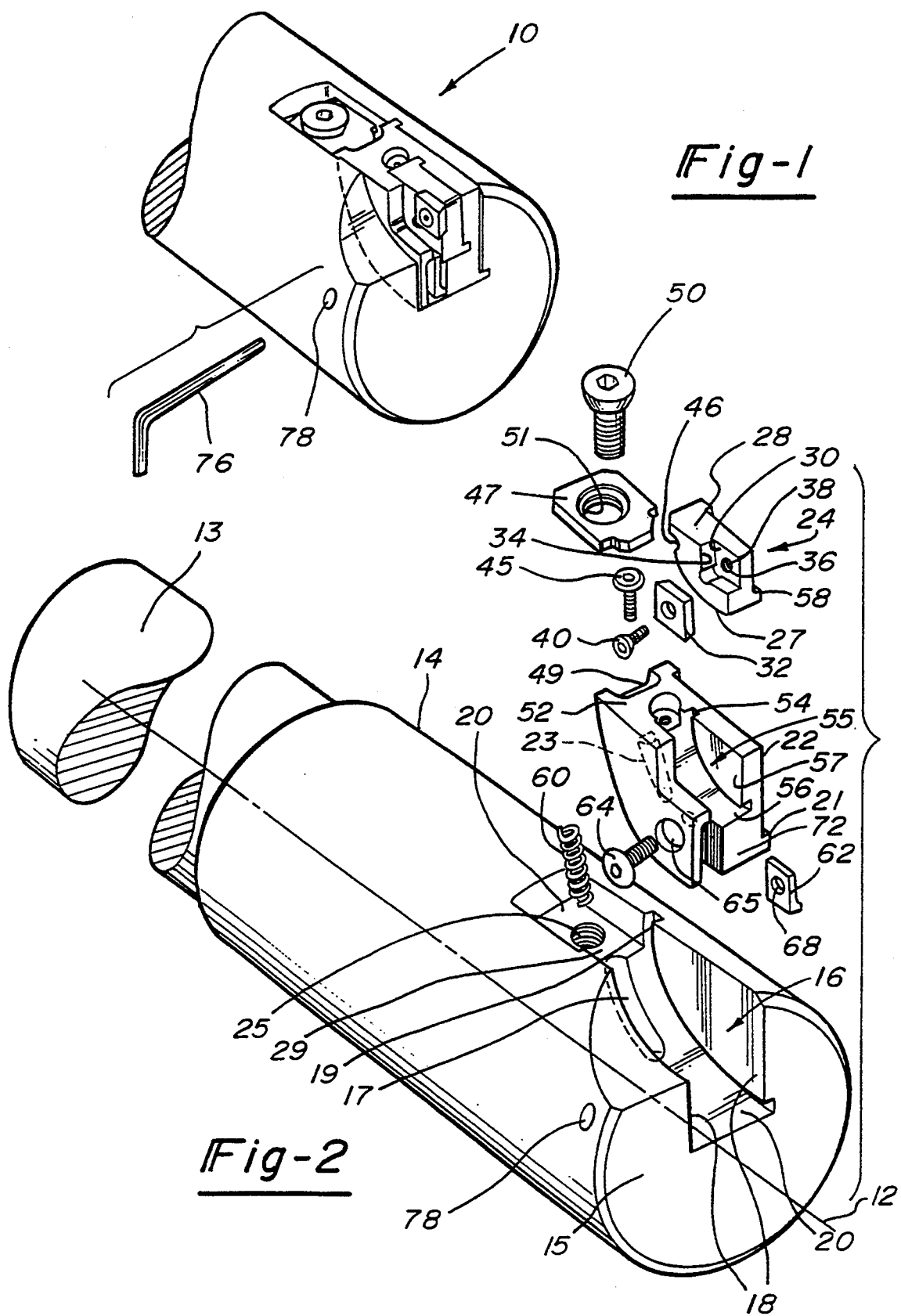

ADJUSTABLE BORING BAR

BACKGROUND OF THE INVENTION

1. Field of the Invention

The present invention relates to the field of machining tools such as boring bars and more particularly to improved boring bars with adjustable cartridges. The boring bar includes a slotted area at one of its ends with an arcuate bottom face on which a correspondingly shaped surface of an anvil is seated. The boring bar also includes means for causing the anvil to slide upon a radiused surface of the boring bar and to rotate the anvil and cutting insert affixed thereto against a tension spring relative to the boring bar a key pin and key seat are provided to retain the anvil at the end of the bar. Set screws are eliminated as the cartridge is held in place by tension generated against the coil spring and the key pin.

2. Description of the Related Art

Pataky, U.S. Pat. No. 3,885,282 describes a machining tool including a holder and insert to which a cutting tool can be attached. The insert is rotatably mounted in a recess in the holder and fixed in a desired position relative to the holder by a locking screw. Rotatable adjustment o the insert allows for the altering of the tip working angle.

Jester et al., U.S. Pat. No. 4,631,994 describe a linearly and angularly adjustable holder for a cutting tool. Such tool permits pivotal adjustment by means of an adjustment screw having a threaded portion seated in a basic element and a head which engages a recess in a rotatably mounted receptacle element which holds a cutting tool insert. Rotation of the adjustment screw causes rotation of the receptacle element.

However, the structures described in the above mentioned patents are not directed to alleviating the problem of "stacked" tolerances. In addition, high speed boring bars cannot meet the precision cutting parameters required today with traditional cartridges mounted to the periphery of the boring bar due to the chatter created. Although creating a recess large enough to seat the cartridge within the bar amy stabilize the bar, radial adjustment where the adjustment force is directed against the bar would still induce bowing of the bar in narrow diameter boring bars.

Reiterman, U.S. Pat. No. 4,927,301, which is incorporated by reference as if fully set forth herein, is directed to an improved boring bar which meets the shortcomings of bowing and stacked tolerances. The bar is equipped with an anvil shaped cartridge which fits into a radiused bottom shaped groove in the bar. The anvil is adjusted by means of loosening a set screw, adjusting the anvil by means of an arcuate headed screw which forced the anvil against a spring washer retained by another screw at the opposite end of the anvil, and then, when the desired position is reached, the set screw is again rotated to lock the assembly in place.

The present invention is an improvement over U.S. Pat. No. 4,927,301. The lock screw is eliminated, as are the spring washers. The method of operation is thereby simplified to a one step adjustment, thereby resulting in ease of operation, elimination of the set screws, and substantial labor savings.

Noggle et al, U.S. Pat. No. 5,154,551 relates to an improved adjustable boring bar having an adjustable cartridge including an anvil rotatably affixed to the boring bar. The cartridge is located at a point intermediate the ends of the bar. The anvil is secured in an axially oriented slat which includes an arcuate seating face. A leaf spring arrangement is used to urge the anvil against a single adjustment screw. Rotation of the anvil within the slot effects radial adjustment of the insert.

The present invention is designed to address boring bars wherein the adjustable anvil is carried at the end of the boring bar.

It is therefore an object of the present invention to provide an adjustable insert cartridge recessed at one end of the boring bar where the force required for radial adjustment of the inserts is insufficient to induce bowing a boring bar.

It is a further object to provide an adjustable cartridge which is properly balanced in high speed applications and which reduces the stroke necessary to clear the bar from a hole in a work piece. Also it is possible to adjust both size and lead angle or back taper.

Finally, it is a further object of this invention to provide an adjustable cartridge which is easily adjusted and which holds the cartridge in place without the need for lock screw.

SUMMARY OF THE INVENTION

The present invention is directed to an adjustable cartridge in one end of a rotatable boring bar which is easily adjusted by rotation of a single screw. The boring bar has a longitudinally oriented recess at one end of the bar with planar parallel walls which are in spaced a part orientation by the width of an arcuate seating surface. It is important that the cartridge seat have full contact, or at least two point contact, on the seating surface. It had been a disadvantage of the prior art that the cartridge sometimes did not seat along the seating surface in at least two points, thereby contributing to the chatter phenomenon observed when using such boring bars. The seating surface intersects the parallel walls and opens radially to the periphery of the boring bar.

The cartridge includes an anvil with a top face and a radiused bottom face. The anvil top face includes a recessed pocket for receipt of an indexable insert, positioned on the forward portion of the anvil. The radiused bottom face of the anvil extends between the forward and rear portions and includes a key flange which fits into a key way slot in the cartridge. The rear portion of the anvil is recessed for receipt of means for adjusting the anvil in the said cartridge arcuate seat.

The cartridge itself has radiused upper surface to cooperatively engage the radiused bottom face of the anvil. A key way slot is provided adjacent to said radiused surface to slideably engage the key flange on the anvil and thereby cause the anvil to ride along the radiused upper surface. A threaded recess is provided at the rear portion of the cartridge upper radiused surface to accommodate the means to adjust the anvil in the slot.

The cartridge also has an arcuate bottom seat which is configured to be seated in the arcuate seating surface of the bar. A key flange is provided to engage with the key way slot in the bar to cause the cartridge to ride along the arcuate seating surface of the bar.

The cartridge is provided with a first recess at the top, reward portion to accommodate a preload means, and a recess in the bottom of the cartridge to accommodate a coil spring which urges the cartridge against the preload means. By this arrangement, an operator can adjust the cartridge position in the bar.

The insert is positioned on the anvil and is axially spaced from the rotational center of the anvil such that fine adjustment may be accomplished and such that loading resulting from cutting operation is principally transferred to the bar. Inwardly directed cutting reaction forces on the cutting edges thus tend to load the anvil and the adjustment means rather that the preloading means. An advantage of the present invention is that the resilient preloading means is removed from the loading action, allowing for precision adjustment while minimizing chatter. Another advantage is that an indexable insert and adjustable cartridge is provided in a boring bar without removal of a large portion of bar stock, thereby maintaining tool strength. A further advantage is that the rotation of the anvil in the bottom of the bar eliminates the need for adjustment means which load the boring bar to the extent of inducing bowing in small diameter bars. Another improvement is that the cartridge may be adjusted in the arcuate slot and held in place without resort to lock screws passing through the bar and abutting the adjusting screw for the anvil or other means to retain the anvil against the side wall of the recess to retain the anvil in place. A final improvement is that an end of bar boring bar is provided which reduces chatter during operation and which reduces the stroke necessary to clear the bar from a hole in a work piece.

BRIEF DESCRIPTION OF THE DRAWINGS

FIG. 1 is a perspective sectional view of one end of the boring bar of the present invention containing at least one adjustable cartridge.

FIG. 2 is an exploded perspective view of the boring bar and cartridge illustrated in FIG. 1.

DETAILED DESCRIPTION OF THE PREFERRED EMBODIMENTS

Figure 3:
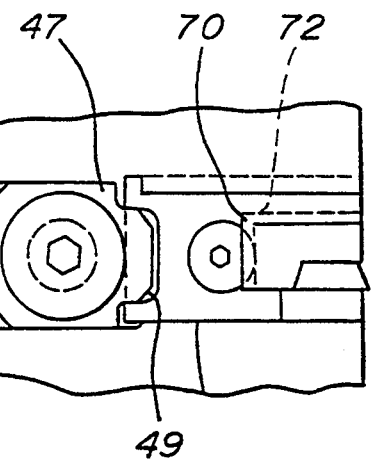
FIG. 3 is a top plan detail view showing the engagement of the adjustment screw to the adjustable cartridge and the adjustment screw to the anvil.

Referring to the figures, wherein like numerals depict like structures, a boring bar 10 is provided for rotation about a longitudinally disposed axis 12. Boring bar 10, as is known in the art, is of cylindrical form having a periphery 14. The bar has two opposite ends, 13, 15 and at least one arcuately dimensioned slot or recess 16 at one end of the bar. The recess includes parallel walls 18 joined at an arcuate seating surface 20 which opens radially toward the periphery at its one end, and the end of the bar at its other end. The accurate seating surface further includes an arcuate key seat 19 which helps retain the cartridge 22 in a manner to be described. A recess 17 is provided to accommodate preload means 60.

The cartridge 22 is generally an elongated piece of hardened tool steel having a uniform width and an axial dimension corresponding to the particular recess 16 selected. The cartridge 22 further includes an arcuate lower surface 26 which corresponds to the arcuate seating surface 20 to allow for axial rotation in the clockwise direction, or counter clockwise direction, depending upon the manner in which it is desired to adjust the cartridge. The cartridge is further equipped with an arcuately shaped flange member which is Key 21. Key 21 is of such configuration to fit the key slot 19 and retain the cartridge within the arcuate slot 16.

Figure 5:
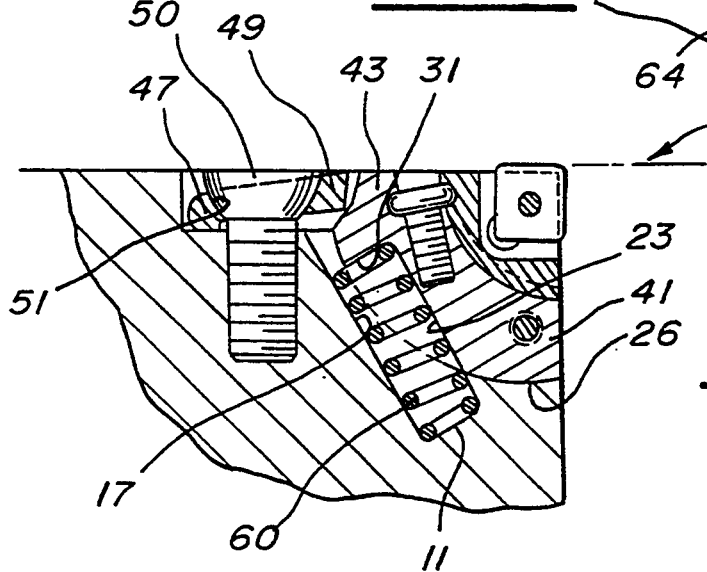
FIG. 5 is a cut away side view of the end of bar adjustable cartridge showing the preloading coil spring under tension.
Figure 6:
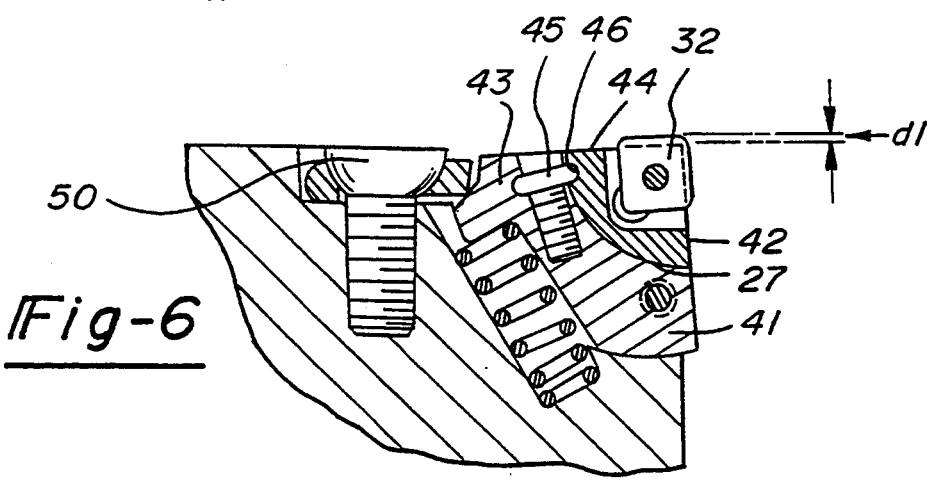
FIG. 6 is a cut away side view of the end of bar adjustable cartridge of FIG. 5 showing the adjustment of the cartridge when the load is released from the preloading coil spring.

The cartridge is equipped with a blind recess 23 in its lower surface to accommodate preload means 60 cooperatively with recess 17 in the boring bar, as seen in FIGS. 5 and 6. Note stop 31 at the end of the blind recess provides a shoulder which the spring reacts against. Similarly, end 11 in recess 17 provides a similar shoulder.

Anvil 24 includes a top face 28 radially spaced from lower radiused surface 27 and at least one pocket 30 for receipt of an indexable insert 32. The pocket has at least two abutment walls 34 which intersect with a seating face 36. Seating face 36 includes an aperture 38 tapped to provide secure retention of an insert retaining screw 40. Although other securing means are available to those of ordinary skill in the art and are readily useable in the present invention with the appropriate modifications, a standard "iso" screw is preferred due to space and weight considerations near the work piece.

Referring to FIGS. 5 and 6, top face 28 includes axially spaced forward portion 42 and rear portion 44 separated by insert 32. The arcuate lower surface 27 extends from the forward 42 to rear portion 44. The rear portion 44 includes a first recessed area 46 which communicates motion from means 45, which is a screw, for adjusting the anvil on the cartridge.

The arcuate lower surface 26 extends from the forward portion 41 to the rear portion 43 of the cartridge. The rear portion 43 includes a first recessed area 49 which accommodates plate 47, held in place by a hex screw 50 which is passed through aperture 51 and is threaded into threaded hole 25 in retainer pocket 20 of the boring bar. The retainer pocket is of sufficient depth and dimensions so as to accommodate plate 47 such that plate 47 is held flush to below the periphery 14.

When screw 50 is tightened, the spring 60 is compressed and the cartridge is moved counter clockwise along the radial slot. When screw 50 is loosened, the spring 60 is released and urges the cartridge in a clockwise direction. As the cartridge moves, the insert moves the distance "d" to "d1". Thus, radial adjustment of insert 32 is achieved. Although the range of adjustment is at least as much as the total "stacked" manufacturing tolerances of cartridge 22 and bar 10, a range of adjustment through adjustment means 50 of as much as 0.020 inches is preferred.

Turning now to the anvil, in order to eliminate slippage, a right hand screw is desired with a fine pitch and in particular with at least about 32 threads per inch. There is no need for a securing screw to lock screw 50 in place as was the case in the prior art, particularly U.S. Pat. No. 4,927,301. This is a distinct advantage as the operator may easily adjust the anvil and be confident that it will remain in place without the added step of locking the screw in place with a locking set screw. The elimination of this lock screw results in substantial savings both in cost of manufacture because there is no need to drill holes into the side of the bar transverse to the axis of rotation for receipt of the set screw, thereby contributing to the increased strength of the bar, and labor costs are reduced because the adjustment process has been simplified.

Figure 4:
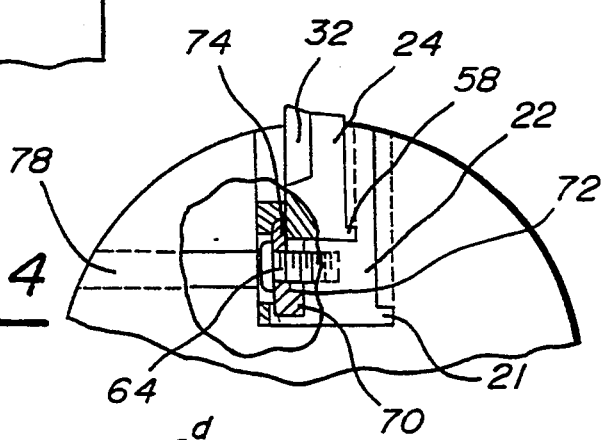
FIG. 4 is a detail end view of the boring bar showing the key and pin arrangement which serves to retain the adjustable cartridge and anvil in their respective key ways.

The cartridge is equipped with an arcuate slot 55 which runs from front surface 41 to top surface 52 of the cartridge. The slot has parallel sidewalls 57 and an arcuate seating surface 56. A key slot 54 is provided to accommodate key flange 58 on the anvil. In order to secure the anvil in place in the slot of the cartridge, plate 62 is provided which, as seen in FIGS. 2 and 4, is held in place by screw 64 which passes through hole 65 in the cartridge and is threaded into bore 66 and through aperture 68 in the plate. The plate has foot 70 which seats against the cartridge so that the face of the plate is parrallel to the side of the cartridge, as seen in FIG. 4. This is accomplished by use of a hex wrench 76 which is inserted into channel 78 which passes through the boring bar. The channel communicates with the hex screw 64. When the operator wishes to lock the anvil in a desired position within the cartridge, the hex wrench 76 is inserted through channel 78 and the screw is tightened, thereby clamping plate 62 against the anvil locking it in place in the cartridge. It should be apparent that in this manner, it is possible to adjust the anvil in the cartridge without removing the cartridge from its slot 16.

The anvil is forced to follow the key slot 54 by the cooperation of key flange 58 and slot 54. The plate 62 forces the key to remain in the slot so the adjustable anvil is moveable only within the slot and further serves to retain the anvil in the slot at the end of the bar.

In operation, the plate 62 is loosened and the arcuate headed screw is rotated. As the screw is rotated, it causes forces the anvil to follow the arcuate path and allow adjustment of back taper or lead angle of the inserts and when the cartridge is to be adjusted screw 50 is rotated and causes the force of the preloading means to be relieved, and the spring expands, thereby moving the cartridge and by necessity, the insert. This can be seen by reference to FIGS. 5 and 6 wherein the adjustment cause the insert to change position from d to d1.

Lay down inserts 32 comprise generally a wafer of hardened material such as tungsten carbide, ceramics or sialons to name a few. The desired material is dependent on the type of application and the boring parameters. For example, an 2⅛ inch boring bar about 32 inches in length and employing five adjustment cartridges as claimed and disclosed herein, ⅜ wide by 0.460 inch parallelogram shaped inserts available from GTE Valenite Corporation using tungsten carbide grade VC-2 are employed for soft abrasive materials such as cast iron. For boring applications in carbon steel, carbide grade VC-5 is available. In addition, various positive and negative cutting rakes are contemplated depending on the application. When boring in carbon steel, it is preferable to employ parallelogram shaped inserts using a positive radial and axial rakes. In cutting materials such as cast iron, negative axial and radial rakes are employed. It will be recognized by those of ordinary skill in the art that the range of axial and radial rake angles will depend on a range of variables including the part specifications.

The position of insert 32 and insert pocket 30 on top face 28 is important to obtaining the above disclosed range of adjustment. When anvil 24 is rotated within recess 55, it rotates about an anvil central axis when unrestricted by adjustment means. Positioning pocket 30 and insert 32 axially from a central axis toward forward portion 42 results in a decreasing range of adjustment the closer the pocket is placed to central axis 66.

Although the exact position of insert 62 in anvil 24 depends in part on the size of the insert and anvil, it is generally known to those of ordinary skill in the art that loading during operation is absorbed by the boring bar rather than preloading means or adjusting means the closer the pocket 30 is placed toward the cartridge central axis. This results in reduced cartridge adjustment.

The present invention eliminates the need of a plurality of tapped apertures which would traverse the boring bar 10 in a direction generally normal to the recess walls and which open to the boring bar periphery 14 to provide access to an operator. The apertures allow the insertion of screws to force the cartridge to abut one wall of recess 16, thereby holding it in place. The elimination of these screws results in a substantial savings in operation, machining costs and tool strength.

In operation, rapid adjustment of the radial position of the inserts 32 is accomplished by adjusting screw 50, thereby forcing arcuate screw head 51 against conical surface 47 of the first recess 49 of rear portion 43 of cartridge 22. The camming force developed between screw head 51 and the first recess 46 drives cartridge 22 along arcuate seat surface 20, rotating anvil 24 in the desired direction. Insert 32, spaced axially from the rotational central axis 64 of the anvil is generated radially a distance "d" to a new distance "d1". At the desired point of adjustment, rotation of screw 50 is halted and the preloading means, depicted as coil spring, holds the cartridge in place without the need for set screws or the need for means to force the cartridge to abut one of the side walls of recess 16. Back taper and lead angles are adjusted by rotation of screw 45.

Those skilled in the art recognize that various modifications may be made to the structures described herein without departing from the scope and spirit of the invention.

I claim:
1. A boring bar assembly, comprising:
a generally cylindrical body rotatable about a centrally disposed axis, said body comprising a peripheral surface area and at least one recess at one end of said bar, said recess having an axial length dimension and spaced walls substantially parallel with respect to each other and said axis, said bar recess further including arcuate seating surface and a key slot way which is arcuate and adjacent to said seating surface, said seating surface and key slot intersect said walls and open radially to the periphery at one end and open to the end of the bar at the other end, said bar recess further equipped with an arcuately shaped recess in said seating surface to accommodate a preloading means; said bar further equipped with a retainer pocket at the peripheral end of said arcuate recess; said pocket having parallel side walls, a planar floor surface and a threaded bore in said floor surface;
an adjustable cartridge for receipt into said bar recess, said cartridge having a planar top surface and a radiused bottom face cooperating with said bar recess seating surface to define a rotational adjustment path and a key to cooperate with said bar key slot way; said cartridge having forward and rear portions, said radiused bottom surface rear portion having a recessed area for cooperative engagment of said preloading means, said cartridge further equipped with an arcuately shaped upper recess having an axial length dimension and spaced walls substantially parallel with respect to each other and said axis, said upper arcuate recess having an upper arcuate seating surface, said upper seating surface having an axial length and separating spaced walls substantially parallel to each other and said axis, and a key slot way which is arcuate and adjacent to said upper arcuate seating surface; said arcuate upper recess extending from said front portion of said cartridge to a point intermediate said rear portion on said top surface; said top surface equipped with a recess comprised of three planar walls and a planar floor and open along the top and rear portions of the cartridge;

a retainer plate means in said retainer pocket and extending to said recess in the top surface portion of said cartridge to cooperate with the preload means;

an adjustable anvil for receipt into said upper recess having a generally planar top face and a radiused anvil bottom face cooperating with said cartridge upper arcuate seating surface to define a rotational adjustment path and a key to cooperate with said upper key slot way, said top face further comprises axially spaced forward and rear portions, said radiused face extending from front to rear portion of the anvil; said radiused bottom surface rear portion having a recessed area for cooperative engagment with an adjustment means, said anvil further equipped with a pocket for receipt of a polygonal form lay down indexable insert, said insert having a cutting edge and seated in said anvil with said cutting edge spaced axially from said center point so as to impart rotational force about said center point and loading on said bar adjustment means during operation;

means for adjusting said cartridge in said boring bar along said adjustment path; and means for retaining said anvil in said upper arcuate slot.

2. The boring bar assembly of claim 1, wherein said cartridge preloading means comprises a coil spring which recess within the arcuate slot and engages said anvil on said second recessed area of said anvil.

3. The boring bar assembly of claim 1, wherein said cartridge adjusting means comprises a screw threaded in said boring bar and abutting said rearward portion to drive said anvil along said seat in a rotation and thereby effect radial adjustment of said cutting edge.

4. The boring bar assembly of claim 1, wherein said insert cutting edge has a neutral axis rake and a positive radial rake.

5. The boring bar assembly of claim 1, wherein said cartridge rearward portion recess comprises a seat for a spring plate.

6. The boring bar assembly of claim 1, wherein said adjusting means provides a range of radial adjustment of about 0.020 inches.

7. The boring bar assembly of claim 1, wherein said insert is parallelogram in form.

8. The boring bar assembly of claim 1, wherein the means to retain said anvil in said upper arcuate slot is a plate with screw which passes through an aperture in the plate and urges the plate against the anvil, thereby retaining it in place.

9. The boring bar assembly of claim 8, wherein the bar is provided with a channel transverse to the axis of rotation to allow access to said screw.

* * * * *